United States Patent [19]

Goldman et al.

[11] Patent Number: 4,708,089

[45] Date of Patent: Nov. 24, 1987

[54] ANIMAL HABITAT SYSTEM FOR USE IN AN ANIMAL ENCLOSURE

[75] Inventors: Jerome Goldman, New York; Marvin Goldman, Great Neck; Gerald Phillips, Glen Cove; Terry Goldman, New York; Joseph Pesin, Brooklyn, all of N.Y.

[73] Assignee: Penn Plax Plastics, Inc., Garden City, N.Y.

[21] Appl. No.: 873,650

[22] Filed: Jun. 12, 1986

[51] Int. Cl.⁴ ............................................. A01K 64/00
[52] U.S. Cl. ........................................... 119/5; 428/15; 446/102; 446/153; D30/106
[58] Field of Search ........................................ 119/2–5; 428/15, 13, 25, 28; 446/102, 128, 153; D30/6–12

[56] References Cited

U.S. PATENT DOCUMENTS

| | | | |
|---|---|---|---|
| D. 134,954 | 2/1943 | Greenberg | 119/5 X |
| 2,824,728 | 2/1958 | Crawford | D30/12 |
| 3,744,454 | 7/1973 | Willinger et al. | 119/5 |
| 3,763,997 | 10/1973 | Willinger et al. | 119/5 X |
| 4,006,712 | 2/1977 | Frank | 119/5 |
| 4,318,945 | 3/1982 | Goldman et al. | D30/12 |

FOREIGN PATENT DOCUMENTS

| | | | |
|---|---|---|---|
| 2918012 | 11/1980 | Fed. Rep. of Germany | 119/5 |
| 1618 | of 1858 | United Kingdom | 119/5 |

Primary Examiner—Carl D. Friedman
Assistant Examiner—Richard E. Chilcot, Jr.
Attorney, Agent, or Firm—R. Scott Goldman

[57] ABSTRACT

A habitat system for use in small animal enclosures providing desirable living space for underwater, amphibious and land dwelling animals. The habitat is formed from a wall type structure with one side which is essentially concave, thereby forming a gap space behind the wall. The habitat system is removeably attachable to the inner wall surface of the animal enclosure. Surface decoration may be provided on at least one wall of the habitat system, and various component parts may be intermeshed in a variety of ways in order to form multiple configurations.

15 Claims, 10 Drawing Figures

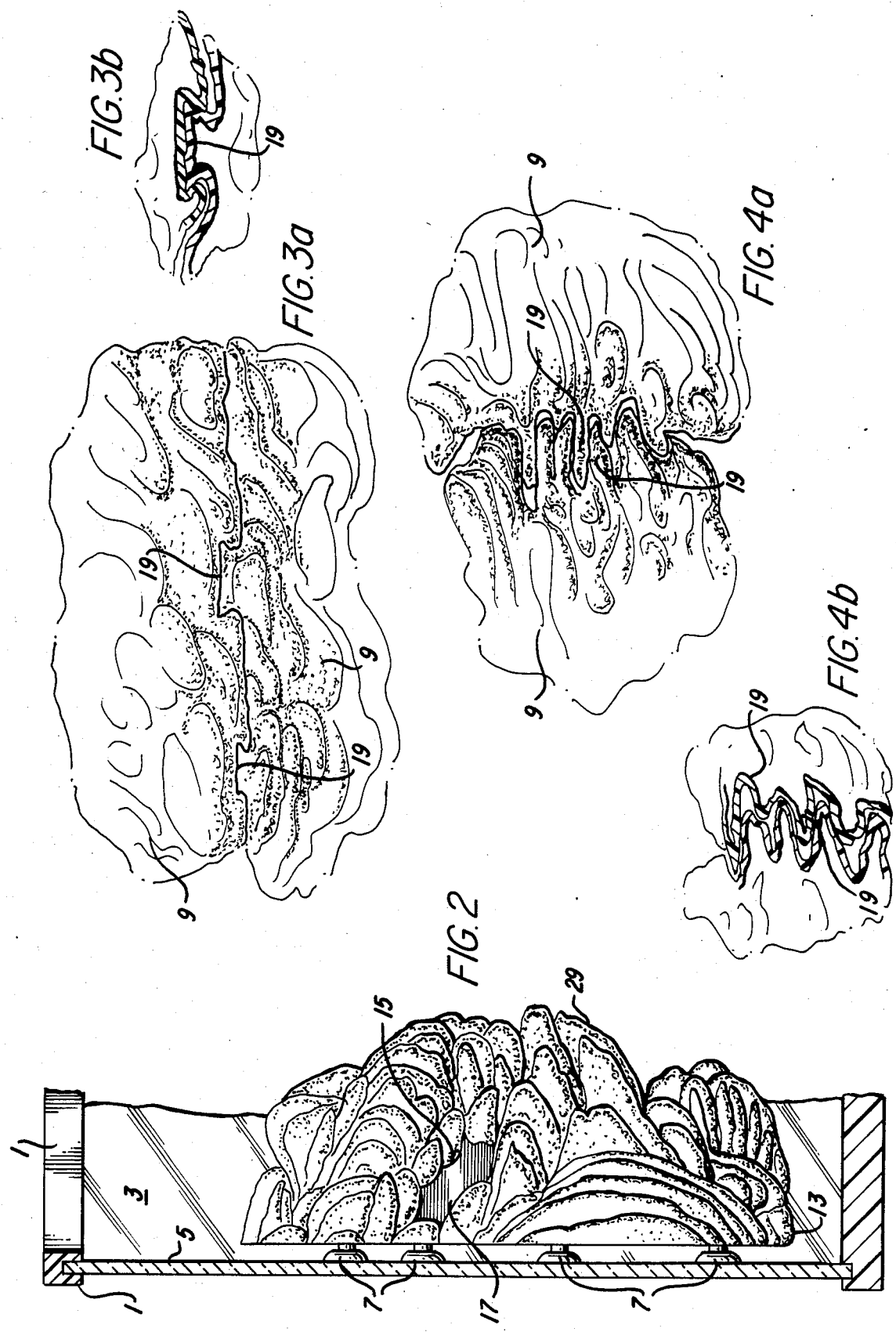

ANIMAL HABITAT SYSTEM FOR USE IN AN ANIMAL ENCLOSURE

BACKGROUND AND SUMMARY OF THE INVENTION

The present invention relates to a habitat system for small animals which may be removeably placed within an aquarium or cage type animal enclosure. The inventive habitat system is removably attachable to any inside surface of the aquarium or cage, including the bottom surface in a manner so that a gap space or cavity is formed between the the interior surface wall of the aquarium and the inner surface forming the wall of the habitat system. The habitat system is removeably attachable to the interior surface wall of the animal enclosure in a manner so that the integrity of the wall surface is maintained, despite repeated attachment and removal of the habitat system to the inner surface wall of the enclosure.

The present habitat system is adaptable for use with both aquarium fish and other under water creatures, as well as with small mammals and reptiles. The term animal enclosure refers to an aquarium or fish tank type enclosure. These terms are used in a conventional manner to include terrariums and any other type of animal enclosure with walls of transparent material, such as glass, plexiglass and clear plastic. Under water animals such as fish, snails and crabs, small mammals such as mice, gerbils and hamsters, and small reptiles such as turtles, snakes, iguanas, and chameleons are traditionally housed in animal enclosures of this type. Also, the term animal enclosure should be interpreted to include other types of animal enclosures such as small mammal cages or even bird cages or insect cages. The present invention may be adapted for use in any conventional type of small animal enclosure based upon the choice of the attaching means used.

Various forms of aquarium, terrarium, and small animal enclosure decorative and ornamental structures are well known in the art. Popular ornamental structures include natural structures such as rocks, logs, shells, plants, caves, and ledges. These items take many forms in the aquarium. Most are fabricated in a manner so that they are secured to the bottom of an aquarium or float in the aquarium water. See for example U.S. Pat. No. 4,318,945, which teaches irregularly shaped shells in the form of rocks which interconnect in a vertical stacking arrangement to form rock like formations. U.S. Pat. No. 3,517,649 teaches a rock type ornament which floats like an island just above the surface of the aquarium. Also known in the art are various structures which attach to the walls of the aquarium to form decorative and ornamental effects. U.S. Pat. No. 4,133,024 teaches a cave like structure which is attached, as one unit, to the interior of an aquarium. It is also known to form shelf like terraces in aquariums by attaching shelfs to aquarium inner wall surfaces by means of suction cups. Further natural or artificial rock backgrounds for use both inside of and outside of aquariums are known in the art.

It is the object of the present invention to provide a habitat system which is decorative in nature and suitable for the housing and play of small animals which are kept in animal enclosures such as aquariums and cages. The invention provides one or more habitat components in the form of a wall type structure which, in conjunction with the interior wall of the enclosure, creates areas which may be called gap spaces, nooks, coves, rooms, crevices or niches in which the small animal may stay, sleep, climb and/or swim through, when the habitat is placed in the animal enclosure.

It is a further object of the present invention to provide a habitat system which may be removed and replaced within the enclosure with great ease, and yet is securely fastened to the enclosure inner surface wall so that the animal inhabitants cannot disrupt the habitat system.

It is a further object of the present invention to provide a habitat system which may be removeably attached to the interior surface of the enclosure in a variety of positions, and which allows for the intermeshing of two or more identical or similar components in a variety of configurations including right angles to form corners, so that an intergrated habitat unit which looks like a single structure is achieved and which may be rearranged and reattached to form a plurality of structures of varying appearance and configuration, without difficulty.

It is an additional object of the present invention to provide a small animal habitat for use in an animal enclosure which will allow for viewing the small animals, when they are in the nook or gap spaces, by looking through the enclosure wall surface which forms the back wall of the gap space or nook.

In order to achieve the above noted and other objectives, the present invention provides one or more habitat system components. The components are formed from a wall type structure have an essentially convex outer side (the side which does not face the animal enclosure wall) and an essentially concave inner side (the side which faces the animal enclosure wall). While either side of the wall my have portions which are not convex or concave, thereby forming an irregular surface topography on either side, the inner side of the wall has an overall concave structure and the outer side wall is therefore correspondingly generally convex.

Based upon the above described structure when the inner side of the habitat system component wall is placed against a flat planar surface such a a sheet of glass or the interior wall of an aquarium or cage, only a small portion of the inner wall of the component actually contacts or is even in close proximity to the planar surface. The contact points with the planar surface are essentially limited to all or a part of the circumferential edge portion on the inner wall side and any convex portions on the generally concave inner wall surface. The major part of the inner side of the habitat wall, being concave in nature, is therefore raised away from the planar inner wall surface of the animal enclosure thereby forming the objective nooks or gap spaces for the animals. In other words, a major portion of the inner side wall is substantially depressed from the highest point thereof, and the gap spaces are enclosed by the essentially concave inner side wall.

The size of the habitat component will vary based upon the size of enclosure in which they will be placed and the number of components used to for the habitat system. The inventors have determined that the sizes ranging from 3 to 24 inches in either direction, or in diameter, and more preferably 5 to 12 inches, are preferable for use in conventional aquarium and cage type enclosures. These sizes have been found to allow for the formation of a wide variety of configurations by allowing for, the use of a plurality of components in a number of different positions in the enclosure. Also, the depth of the cavity forming the concave inner side wall should be in the range of 1 to 6 inches and preferably 2 to 4 inches when measured from the deepest point on the concave inner side wall to the highest point on the circumferential edge. The thickness of the wall should preferably be in the range from 0.04 to 0.5 inches and more preferably 0.05 to 0.15 inches. The preferred ranges provide significant advantages relating to both accomodating the size of conventional animal enclosures, and in forming suitable nooks or rooms for the animals.

Preferably, the wall of the habitat component should have one or more regular or irregular shaped openings therethrough. The openings should be of various sizes. These openings allow the passage of the animal inhabitants from the main interior portion of the animal enclosure into and out of the nooks or gap spaces formed by the habitat component. One or more openings should be of sufficient size to allow animals of the size of mice and hamsters and larger aquarium fish therethrough, such as about 1 to 4 inches in diameter or longest axis. Also, it is preferable to provide numerous small openings or holes which allow water and air to pass through, along with smaller fish. The habitat is thus able to provide protection and hiding places for smaller fish.

The individual components of the habitat system should also be formed in a manner so that two or more components may be interlocked, intermeshed and/or pivoted into the form of a single larger unit. It is most preferable if the components may be intermeshed with each other at a plurality of points along the circumferential edge of the component, and in a plurality of positions and angles so that a large variety of configurations may be achieved. Also, there should be no specific top or bottom, or left or right sides to the circumferential edge of the component. In this manner individual components may be intermeshed and pivoted without regard to which sides are placed adjacent to each other, and in positions which form right angles to accomodate the cornerns of the animal enclosures. Accordingly, a plurality of components may be used to cover all or any portion of the interior surface of the animal enclosure, including the bottom, as desired.

In order to allow for the above described diversity in configurations, the individual components are preferably formed so that the circumferential edge of the component is irregular in shape. Jagged, rough or uneven projections from the edge of the habitat component facilitate the intermeshing and interlocking of the edges of various components in an infinite number of ways when they are placed adjacent to each other againist the planar wall of the animal enclosure. The irregular circumferential edge may have projections in many directions, including sideways from the circumferential edge toward adjacent components, or forward in the direction in which the inner wall of the component faces (into the animal enclosure). Such a diversity of surface irregularities facilitates the formation of right angles with two or more components.

The inventive habitat system is also preferably decorative in nature. The decoration may be of any type consistent with the maintainence of animals. The decoration should be formed on at least the outer wall surface of the habitat component, and is preferrably consistently applied to all surfaces of the component. Also the decorative theme may be used to facilitate the intermeshing of components, by applying the decoration to be consistent with the formation of the desired irregular edges. In view of the desirability of achieving an irregular circumferential edge, decoration in the form of rocks and stones are preferable. Rounded stone structures which can interlock or flat shale like rock formations are perfectly suited for providing a plurality of irregular intermeshing and pivoting edges. Additionally, such decoration is well suited for fish and small animal enclosures. Also, decoration may be in the form of logs and wood, sunken ship portions, shells, barrels or other suitable structures. All of these decorations facilitate the formation of irregular and intermeshable circumferential edges.

The habitat system of the present invention may be formed from any material which will withstand under water exposure. It should be durable, relatively unbreakable, and non-toxic. Suitable materials are wood, metals, rubber, plastic and the like. Plastic is a preferable material due to its stability and the ease in which it may be molded into the form of suitable structural configurations. The plastic may be in any color which is aesthetically pleasing for use as a habitat system, and preferably the color should be consistent with the surface decoration used on the component. Preferably the components are provided with a variegated pattern to simulate rocks or wood. Further, talc may be added to the plastic material in order to provide the component with a non-buoyant specific gravity in order to facilitate secure attachment to the enclosure wall. The talc content may be up to 40% by weight. Also, the above mentioned variegated pattern may be accomplished by the use of a non-homogenous mixture of thermoplastic material and talc.

The components of the present habitat system must be removeably attachable to the inside wall of an animal enclosure such as an aquarium fish tank or small animal cage. The primary point of attachment is the inner surface of the enclosure wall or bottom. The means of attachment must allow for secure placement of the habitat in the enclosure since the animal inhabitants such as small mammals and larger aquarium fish are generally very active, strong and disruptive. The attachment must be maintained in the face of the animals climbing on, living in, and attempting to move the components. Also, the means of attachment must be such that the integrity of the wall of the animal enclosure is maintained. This is especially important in aquarium type of enclosures when under water inhabitants are housed, but is also of importance when the enclosure is of the cage type. Further, as discussed above, a key feature of the present invention is the ability to form a large variety of structural configurations. The attaching means must allow for the easy removal and replacement of the interchangeable habitat components to allow the pet owner or aquarium hobbiest the freedom to continually change the appearance of the animal enclosure by rearranging the components.

Another concern relating to attaching the components of the present invention to the wall of an animal enclosure is the fact that only a small portion of the inner side wall of the component may contact or be in close proximity to the planar surface wall of the enclosure so as to provide the objective nooks and coves. Therefore, the means of attachment must be choosen with this in mind. An example of a suitable attaching means may consist of corresponding magnet pairs, one of each pair being securely fastened to a point on the inner side of the component wall which will be in close proximity to the planar surface of the enclosure, while the corresponding magnet is placed outside of the enclosure in a manner so that the opposing magnets are adjacent to each other and separated by the animal enclosure wall. This system is well suited for aquarium type enclosures. Magnets may also be used to mount the habitat in a cage type enclosure. In such a case the cage is often made of a metal material and magnets attached only to the habitat component may be sufficient to secure it to the cage. Other attaching means may include hooks or snaps adapted for attachment to the bars of cage type enclosures, or hangers usable on aquarium type enclosures.

The preferred means of attachment for use in aquarium type enclosures is one or more suction cups which are attached to the inner wall of the habitat component so that the suction cup is level or slightly above the highest point on the inner wall side. The suction cups may easily and quickly attach the component to the glass or plastic wall of the aquarium in a secure fashion, while being easily removeable. Suction cups even allow for the sliding of an attached habitat component over the inner wall surface of the aquarium to facilitate arrangement of the components into desired configurations. The suction cups are preferably attached to the inner surface wall of the habitat component on a post type projection from the inner wall surface in the direction of the animal enclosure wall. The suction cup back end may be adapted to securely fit over such a post type structure.

The present invention may also be provided with one or more separate add on cliff or ledge pieces which can be removably secured to the outer wall surface of the habitat component. In this way the hobbiest or pet owner can place ledges at various points on the habitat. The animals may climb and perch on the ledges. Also, food may be placed on the ledges for the animals to eat. These ledges are also decorative and allow for the placement of plants and gravel when used in fish tanks. The ledges are in the form of flattened or rugged surfaces matching the decoration on the habitat wall. They may be attached to the outer wall surface by a variety of means. Slide in grooves or interlocking pins may be used. The inventors have found that a preferable attaching means is achieved by providing tabs on the in the form of small flattened projections which may be inserted in the holes which are formed in the habitat wall.

BRIEF DESCRIPTION OF THE DRAWINGS

The above and other objects of and advantages of the present invention will become readily apparent by reference to the following description when considered with the accompanying drawings, wherein:

FIG. 2 illustrates a preffered embodiment of the present invention with a single component removeably attached to the inner wall surface of an aquarium.

FIGS. 3a and 4a show the intermeshing and interlocking of two habitat components of the present invention. The corresponding FIGS. 3b and 4b are enlarged views of the interlocking and intermeshing circumferential edges.

DETAILED DECRIPTION OF THE DRAWINGS

Figure 1:
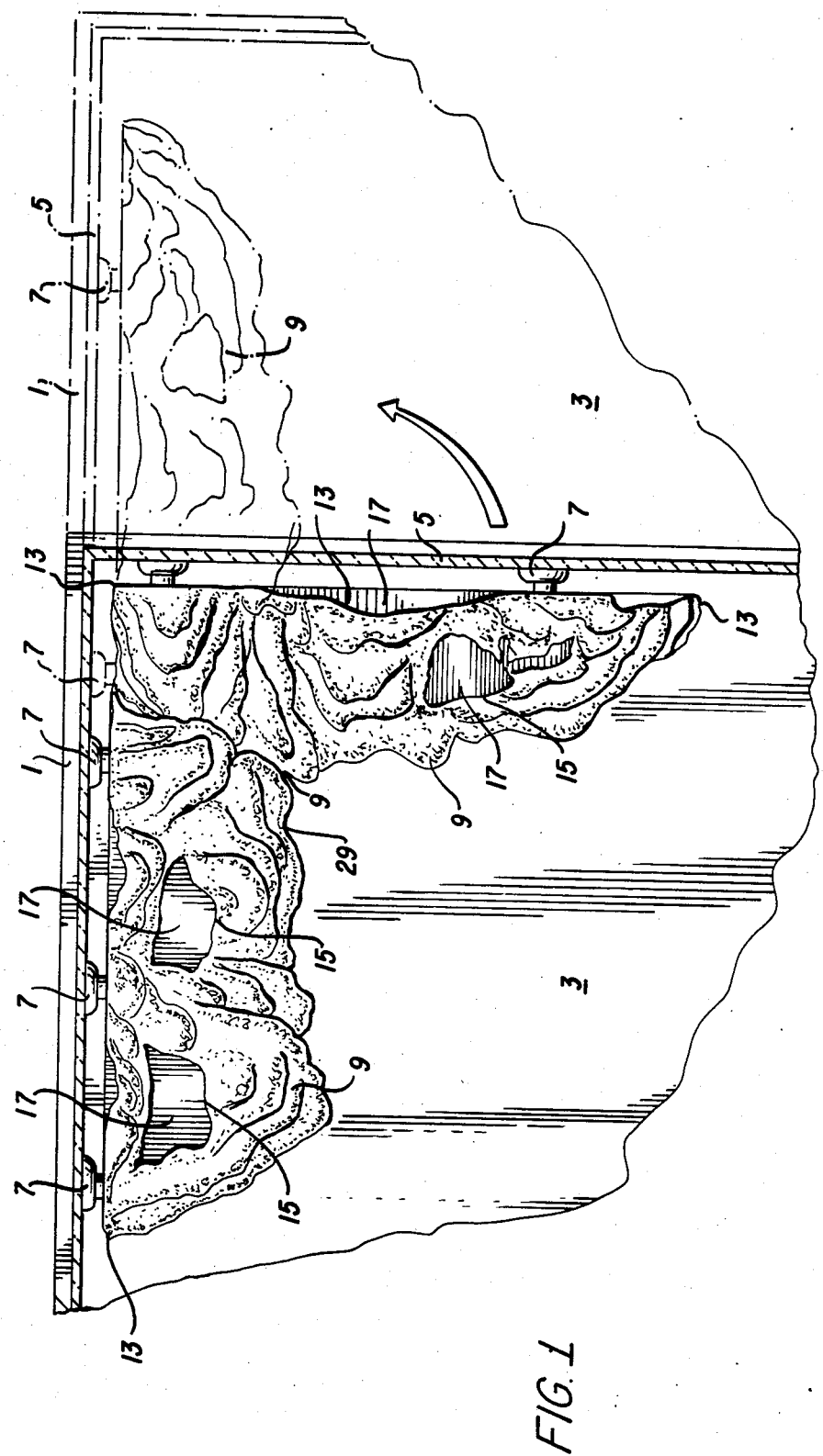
FIG. 1 illustrates a sectional top view of an aquarium type enclosure with a preferred embodiment of the present invention contained therein. The figure illustrates two habitat components attached to the inner wall surface of the aquarium in two possible configurations.

FIG. 1 illustrates a cutaway view of an aquarium type animal enclosure wherein the glass walls of the aquarium are designated 1 and the tank bottom 3. The inner surface wall or planar wall of the tank 5 has attached thereto, a plurality of suction cups 7 which secure the habitat components 9 of the present invention to the aquarium wall. The figures illustrates two habitat components having a rock type surface ornamentation on the outer side wall 29. The figure shows that they may be arranged in either a right angle into the corner of the aquarium, or adjacent to each other on a single surface. The interlocking and intermeshing point 11 where the circumferential edges 13 and outer walls 29 of the habitat 9 meet, may pivot in order to accomodate the desired arrangement. Through the holes 15 in the wall of the habitat component, and behind the circumferential edge 13, the gap spaces or nooks, 17 may be seen.

FIG. 2 illustrates the above structural features. The irregular outer edge 13 can be seen without obstruction from an adjacent piece. The figure also clearly illustrates the convex nature of the outer side wall 29, forming the gap spaces or nooks, on the inner side.

FIGS. 3a–4b show the interlocking of two components 9 of the present invention. The intermeshing is shown from different side of the habitat components. The projections 19 from the circumferential edges of the habitat component or from the outer side wall of the component, are illustrated as facilitating the interlocking and intermeshing of components.

Figure 5:
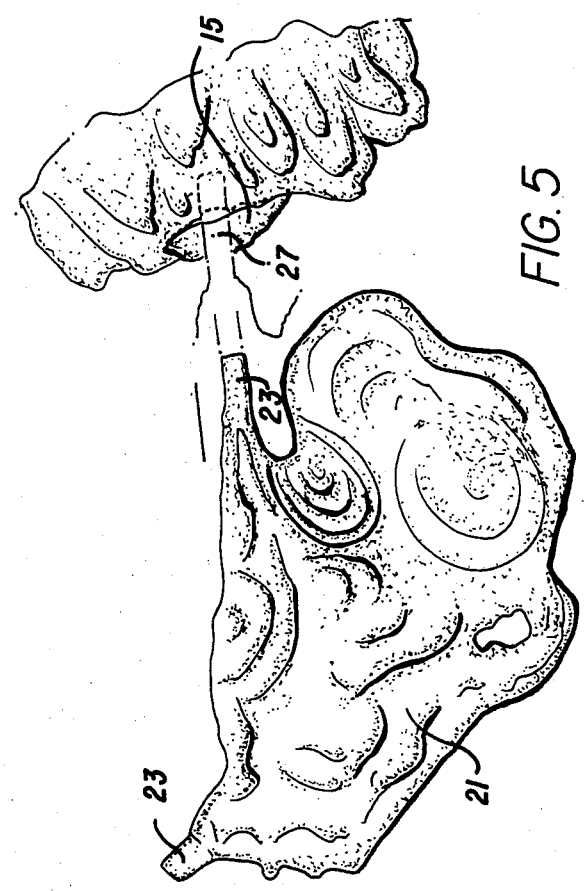
FIG. 5a illustrates ledge or cliff add on pieces which are removeably attached to the habitat component in the preferred manner shown in FIG. 5b.

FIG. 5 shows a cliff or ledge 21 with the flattened tabs 23. The tabs 23 are inserted into the holes 15 in the habitat wall as illustrated in FIG. 5b. The ledge has a rock type surface decoration.

Figure 6:
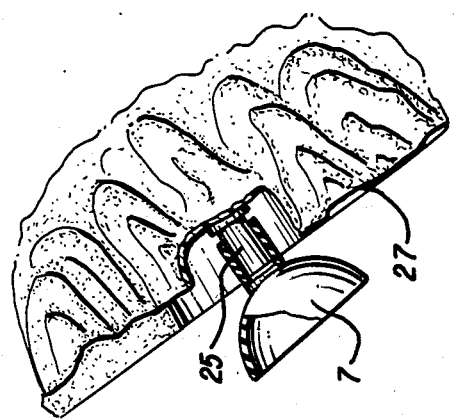
FIG. 6 shows the suction cup attaching means preferably used in the present invention.

FIG. 6 illustrates the preferred suction cup 7 attaching means of the present invention. The suction cup 7 is attached to a post 25 which projects from the inner side wall 27 of the habitat component.

Figure 7:
FIG. 7 illustrates the cavity or nooks formed by the present invention as seen through the back wall of the aquarium enclosure.

FIG. 7 shows the preferred embodiment of the present invention as seen from the outside of the animal enclosure. The attaching suction cups 7 are illustrated. Also visible is the inner side wall of the habitat 27 and the nook or gap spaces 17 for the animals.

It is readily apparent the the above described animal enclosure habitat system meets all of the objectives mentioned as well as providing other advantages for an animal habitat. It should be understood that the specific form of the invention here and above described is intended to be representative only, as certain modifications within the scope of these teachings will be apparent to those skilled in the art of animal enclosures.

Accordingly, reference should be made to the following claims to determine the full scope of the invention.

What is claimed:

1. A small animal habitat system for use in an animal enclosure comprising:
    (a) at least one habitat component in the form of a wall structure having an outer side wall and an inner side wall, the inner side wall being essentially concave, a major portion of the inner side wall being substantially depressed from a highest point thereof, thereby forming a gap space enclosed by the essentially concave inner side wall of the habitat component;

(b) the wall structure further having a circumferential edge which is irregular in configuration, and which is intermeshable, at a plurality of points with a circumferential edge of at least on other habitat component;

(c) one or more openings through the habitat component wall forming a passageway therethrough;

(d) a means to removeably and securely attach the habitat component to a inner wall surface of an animal enclosure, the means formed on the inner side wall of the habitat component.

2. The animal habitat system of claim 1 wherein, at least the outer side wall of the habitat components have a decorative texture formed thereon.

3. The animal habitat system of claim 2, wherein the decorative texture is in the form of rock and stone.

4. The animal habitat system of claim 2, further comprising at least one add on ledge piece which is removeably attachable to the outer side wall of the habitat components.

5. The animal habitat system of claim 4, wherein the ledge pieces are provided with flattened elongate tabs which may be inserted into openings on the habitat component wall as a means of securing the ledge piece to the habitat component.

6. The animal habitat system of claim 2, wherein the habitat component wall structure is molded from plastic.

7. The animal habitat system of claim 2, wherein the means for attaching the habitat component to the animal enclosure is a plurality of suction cups.

8. The animal habitat system of claim 2, wherein the means for attaching the habitat component to the animal enclosure is a plurality of snaps adapted for securing the habitat component to bars on a cage type animal enclosure.

9. The animal habitat system of claim 2, wherein the habitat component ranges in size from 5 to 12 inches in any direction.

10. The animal habitat system of claim 2, wherein the depth of the depression of the concave inner side wall is from 2 to 4 inches.

11. The animal habitat system of claim 2, wherein the the outer side wall of the habitat component is essentially convex.

12. The animal habitat system of claim 2, wherein the at least one opening formed in the habitat component wall is in the range of 1 to 4 inches on its longest axis.

13. The animal habitat system of claim 2, wherein the habitat component has no specific top, bottom or right and left side in relation to the circumferential edge.

14. The animal habitat system of claim 2, wherein the circumferential edge has jagged, rough and uneven projections in both the sideways and forward direction.

15. The animal habitat system of claim 6 wherein talc is mixed with the plastic in an amount up to 40%.

* * * * *